(12) United States Patent
Mohammed et al.

(10) Patent No.: US 10,773,906 B1
(45) Date of Patent: Sep. 15, 2020

(54) LIFT-ACTUATED BOTTOM TOTE DISPENSER

(71) Applicant: Amazon Technologies, Inc., Seattle, WA (US)

(72) Inventors: Raashid Mohammed, Lynnwood, WA (US); Majid Abdul, Bellevue, WA (US); Eric C. Flagel, Everett, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/219,711

(22) Filed: Dec. 13, 2018

(51) Int. Cl.
| | | |
|---|---|---|
| *B21D 43/20* | (2006.01) | |
| *B21D 43/24* | (2006.01) | |
| *B65G 59/06* | (2006.01) | |
| *B65G 65/10* | (2006.01) | |
| *B65G 59/10* | (2006.01) | |

(52) U.S. Cl.
CPC ......... *B65G 59/102* (2013.01); *B65G 59/068* (2013.01); *B65G 59/10* (2013.01); *B65G 2201/0258* (2013.01)

(58) Field of Classification Search
CPC ......... B65B 35/52; B65B 43/46; B65B 43/44; Y10S 414/107; B65G 59/101; B65G 59/10; B65G 59/103; B65G 59/106
USPC ........ 221/289, 298; 414/795.6, 797.4, 797.6, 414/798.4, 927, 928, 929; 53/541
See application file for complete search history.

(56) References Cited

U.S. PATENT DOCUMENTS

| | | | | |
|---|---|---|---|---|
| 2,948,434 A | * | 8/1960 | Wolter | B65G 59/106 221/221 |
| 3,034,683 A | * | 5/1962 | Wilson | B65G 59/101 221/1 |
| 3,160,292 A | * | 12/1964 | Albrecht | B65G 57/165 414/788.2 |
| 3,468,455 A | * | 9/1969 | Voorhis | G07F 13/10 221/225 |
| 3,664,521 A | * | 5/1972 | Feher | B65B 43/44 414/795.6 |
| 3,701,440 A | * | 10/1972 | Windstrup | B65G 59/106 414/795.6 |
| 3,705,657 A | * | 12/1972 | Arnemann | B65G 57/302 414/801 |
| 4,082,203 A | * | 4/1978 | Schjeldahl | B65G 59/106 221/211 |
| 4,270,669 A | * | 6/1981 | Luke | B65G 59/103 221/13 |
| 4,525,978 A | * | 7/1985 | Hayase | A23L 3/001 414/928 |

(Continued)

FOREIGN PATENT DOCUMENTS

JP 6153178 B1 * 6/2017 ............ B65G 59/06

*Primary Examiner* — Gregory W Adams
(74) *Attorney, Agent, or Firm* — Patterson + Sheridan, LLP

(57) ABSTRACT

Embodiments herein describe a tote dispenser that removes the bottom tote from as stack of totes which is then ejected by a conveyor belt. In one embodiment, the tote dispenser includes a first pair of support members which support all but the bottom tote in the stack, while a second pair of support members applies a force that removes the bottom tote from the stack. The first and second pairs of support members can be disengaged so that the stack of totes can be realigned relative to the support members so that the next tote at the bottom of the stack can be removed.

17 Claims, 14 Drawing Sheets

(56) References Cited

U.S. PATENT DOCUMENTS

| | | | | |
|---|---|---|---|---|
| 4,809,881 A | * | 3/1989 | Becker | B65G 59/103 |
| | | | | 141/172 |
| 4,991,741 A | * | 2/1991 | Anderson | B65G 59/106 |
| | | | | 221/223 |
| 5,480,280 A | * | 1/1996 | Bordon | B65G 59/062 |
| | | | | 221/292 |
| 6,099,239 A | * | 8/2000 | Klipp | B65G 59/101 |
| | | | | 414/797.4 |
| 7,959,402 B2 | * | 6/2011 | Hashinokuchi | B65G 57/302 |
| | | | | 221/221 |
| 2017/0225913 A1 | * | 8/2017 | Redman | B65G 61/00 |
| 2018/0134430 A1 | * | 5/2018 | Iida | B65G 59/06 |

* cited by examiner

LIFT-ACTUATED BOTTOM TOTE DISPENSER

BACKGROUND

The present invention relates to dispensing totes, and more specifically, to removing totes one at a time from a stack.

Many warehouses include decant stations where an associate (e.g., a human worker) removes items from their packaging and stores the items in a container (e.g., a tote). For example, multiple items may come packaged in the same box when shipped from the manufacturer. At the decant station, the associate removes the items from the box and places the items in one or more totes. That way, the items can later be retrieved from the totes when fulfilling a received customer order. In this manner, a warehouse can receive bulk items from a manufacturer, store the individual items in totes at the decant stations, and then retrieve the items from the totes (or other containers) to satisfy customer orders.

However, removing and storing the items into totes is a time intensive process which requires the associate to retrieve and maneuver the totes in addition to removing the packaging from the items.

DETAILED DESCRIPTION

Embodiments herein describe a decant station with an automated tote dispenser. That is, rather than relying on an associate to remove a tote from a stack and move the tote into a position for loading items, the tote dispenser can access a tote in a stack (e.g., the bottom tote of the stack) and eject the tote into a position convenient for the associate. When ready, the associate can easily place the tote in a desired location and begin loading items. Automatically dispensing the totes can save time which the associate can then dedicate to removing items from the packaging, thereby increasing the rate at which items can be processed at the decant station.

In one embodiment, the decant station includes a tote buffer station connected to the tote dispenser which is in turn connected to a roller table. The tote buffer station can store one or more stacks of totes on a conveyor belt. When the tote dispenser runs out of totes, the conveyor belt of the buffer station transfers a stack of totes onto a conveyor belt in the tote dispenser. In one embodiment, the tote dispenser removes the bottom totes one at a time from the stack which the conveyor belt of the tote dispenser ejects onto the roller table. In one example, the tote dispenser includes a first pair of support members which support all but the bottom tote in the stack while a second pair of support members applies a force to remove the bottom tote from the stack. Once ejected onto the roller table, the associate can easily position the tote into position for receiving the items. The tote dispenser can then automatically eject another tote. Assuming the decant station does not run out of totes, the tote dispenser can constantly ensure a tote is ready for the associate.

Figure 1:
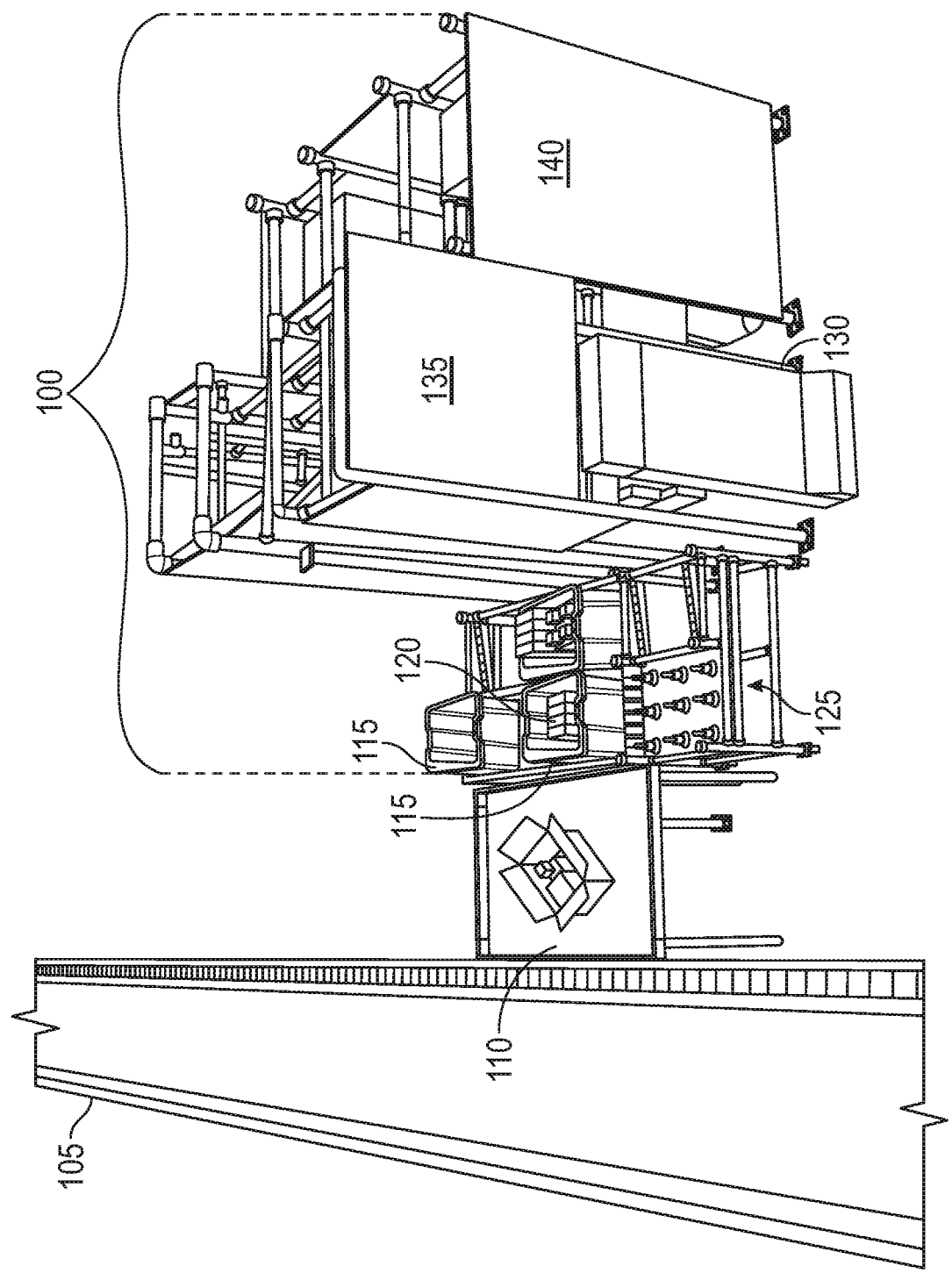
FIG. 1 illustrates a decant station for storing items into totes, according to various embodiments.

FIG. 1 illustrates a decant station 100 for storing items 120 into totes 115, according to various embodiments. The decant station 100 includes a tote buffer station 140 connected to a tote dispenser 135 which is in turn connected to a roller table 125. FIG. 1 illustrates two parallel decant stations (where the further back decant station is occluded) which provide totes 115 for two associates who may stand on opposite sides of a loading table 110. Generally, the totes 115 can be any container with sufficient volume for storing individual items. As packages arrive on a conveyor belt 105, the associates can move the packages off the conveyor belt 105, remove the individual items 120 from the packages, and store the items in the totes 115. Once a tote 115 is full, the associate can move the tote 115 onto an eject slide (not shown) which loads to tote 115 onto a different conveyor belt not shown in FIG. 1. For example, the eject slide may be connected to a conveyor belt that extends below the conveyor belt 105 and carries the full totes 115 elsewhere in the warehouse to be stowed or for further processing.

The decant station 100 includes a tote buffer station, a tote dispenser 135, and a roller table 125 for automatically providing empty totes 115 for the associates. That is, rather than the associate having to physically remove empty totes from a stack, the decant station 100 can automatically remove and eject an empty tote 115 onto the roller table 125 which the associate can then grab and move into a loading position. In this manner, the associate can then replace a full tote 115 with an empty tote 115 without moving from his spot—e.g., the roller table 125 is within reaching distance of the associate.

In operation, the tote buffer station 140 provides totes to the tote dispenser 135 as needed. To that end, the tote buffer station 140 includes a conveyor belt on which one or more stacks of empty totes 115 are stored. For example, the conveyor belt in the buffer station 140 may have a length that permits two tote stacks to be stowed side-by-side. The conveyor belt in the tote buffer station 140 is alignable with a conveyor belt in the tote dispenser 135. Thus, when the tote dispenser 135 has dispensed all the totes in the current stack, a lift 130 in the tote dispenser 135 can align its conveyor belt to the conveyor belt in the tote buffer station 140. Once aligned, the conveyor belts can activate so that a tote stack is transferred from the tote buffer station 140 to the tote dispenser 135. In one embodiment, the tote dispenser 135 and/or the tote buffer station 140 may include a photo eye or other detection sensor for determining when a tote stack has been transferred into the tote dispenser 135 at which point the conveyor belts may be stopped.

The tote dispenser 135 uses the lift 130 to remove a tote from the bottom of the stack and then eject that tote onto the roller table 125. In one embodiment, the tote dispenser 135 includes a first pair of support members that apply an upward force to support all but the bottom tote in the stack while a second pair of support members applies a downward force on the bottom tote using the lift 130. The details for removing and ejecting the bottom tote in the stack are described in detail below.

The roller table 125 stores a tote 115 ejected by the tote dispenser 135 until the tote 115 is needed by the associate. The roller table 125 includes one or more sliding or rolling elements which permit the associate to easily maneuver the empty tote 115 into an item loading area in the decant station 100. The roller table 125 can include an optical sensor that detects when the associate has moved an empty tote into the loading position which instructs the tote dispenser 135 to eject another tote 115. In this manner, the decant station 100 provides an automated method for providing empty totes 115 to the associate.

Figure 2A:
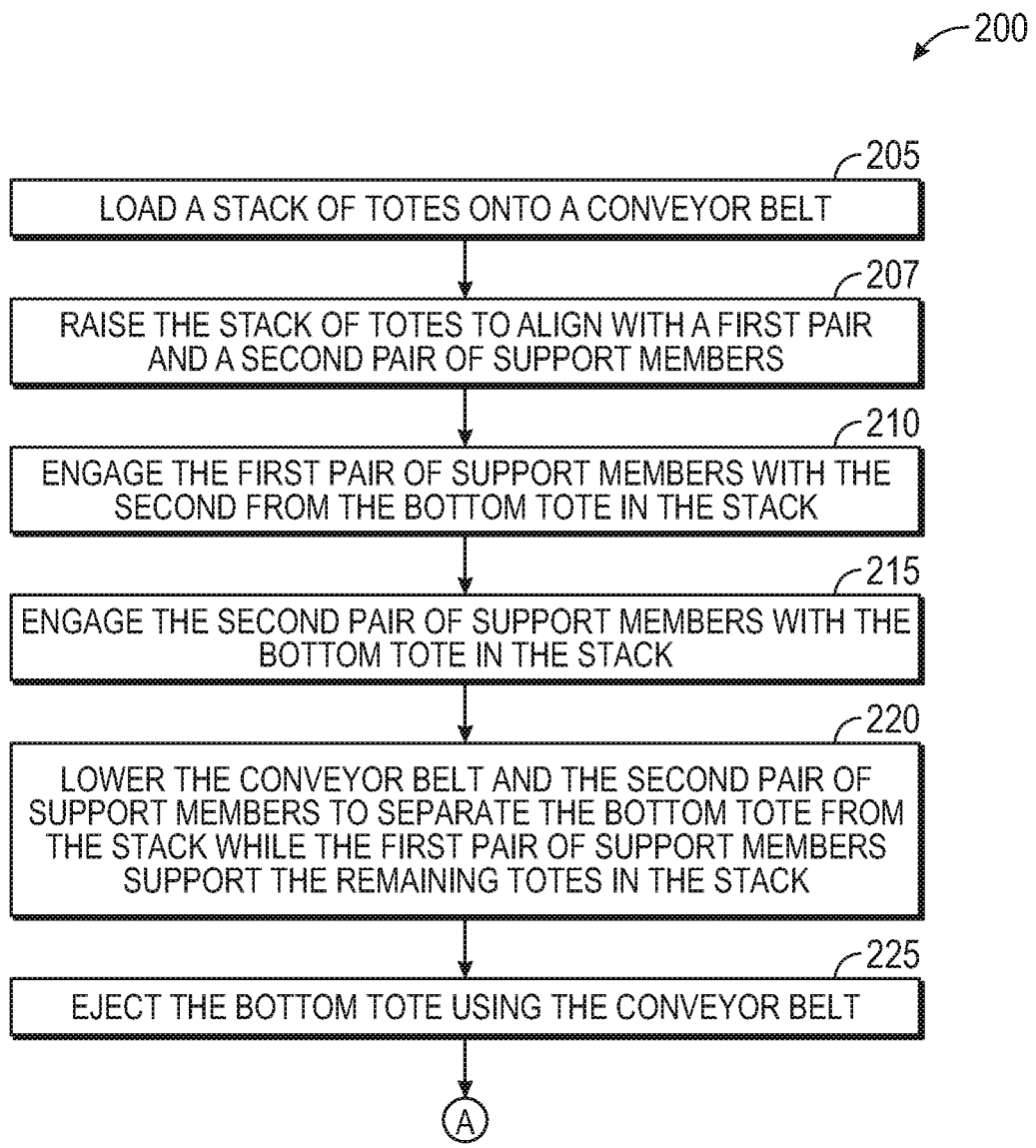
FIGS. 2A and 2B are flowcharts for dispensing a tote from a stack of totes, according to various embodiments.
Figure 2B:
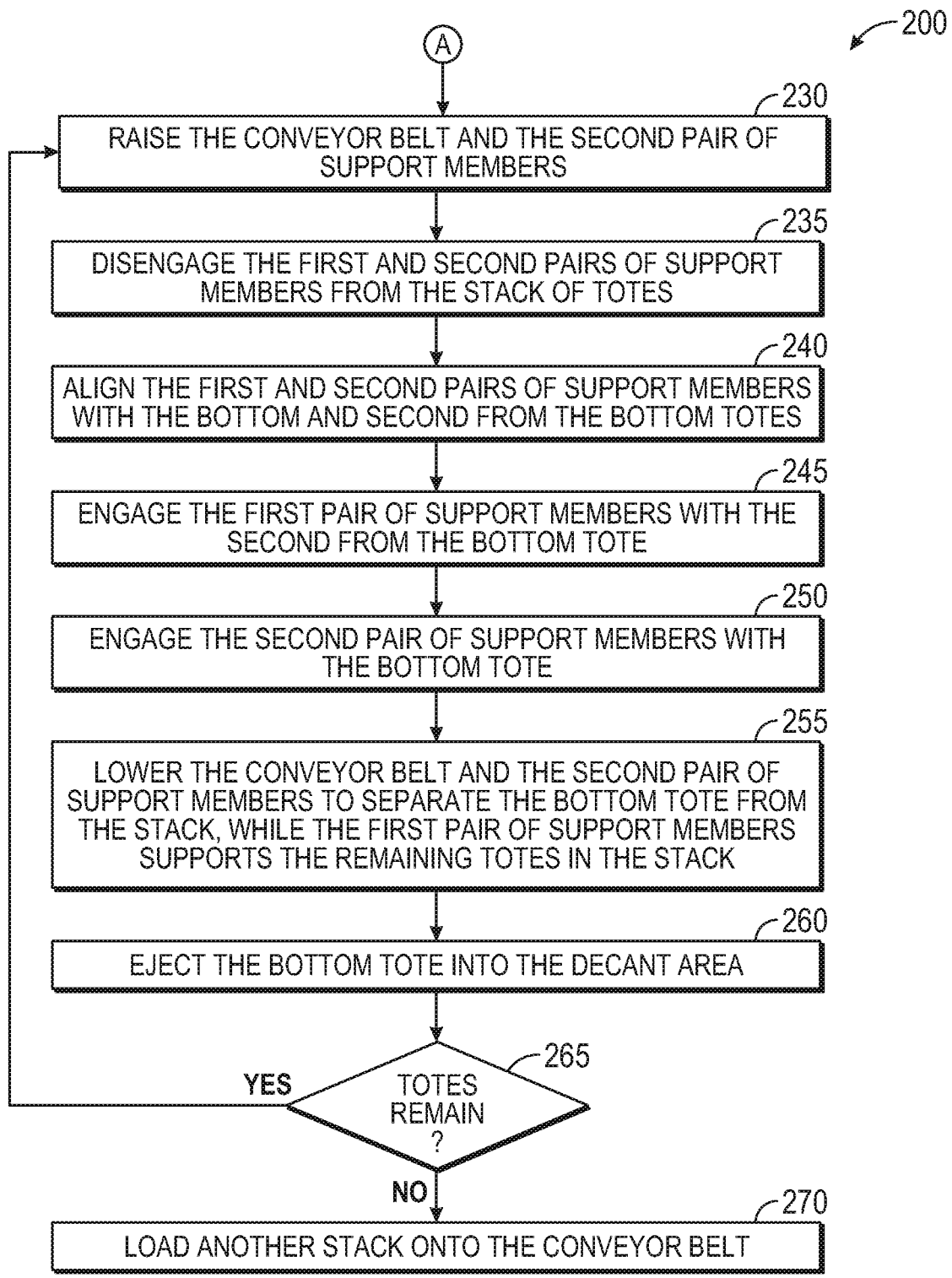

FIGS. 2A and 2B are flowcharts of method 200 for dispensing a tote from a stack of totes, according to various embodiments. FIGS. 2A and 2B will be described in parallel with FIG. 3, FIGS. 4A-4H and FIG. 5. At block 205, the tote buffer station loads a stack of totes onto a conveyor belt in the tote dispenser. The details of the tote buffer station are illustrated in FIG. 3.

Figure 3:
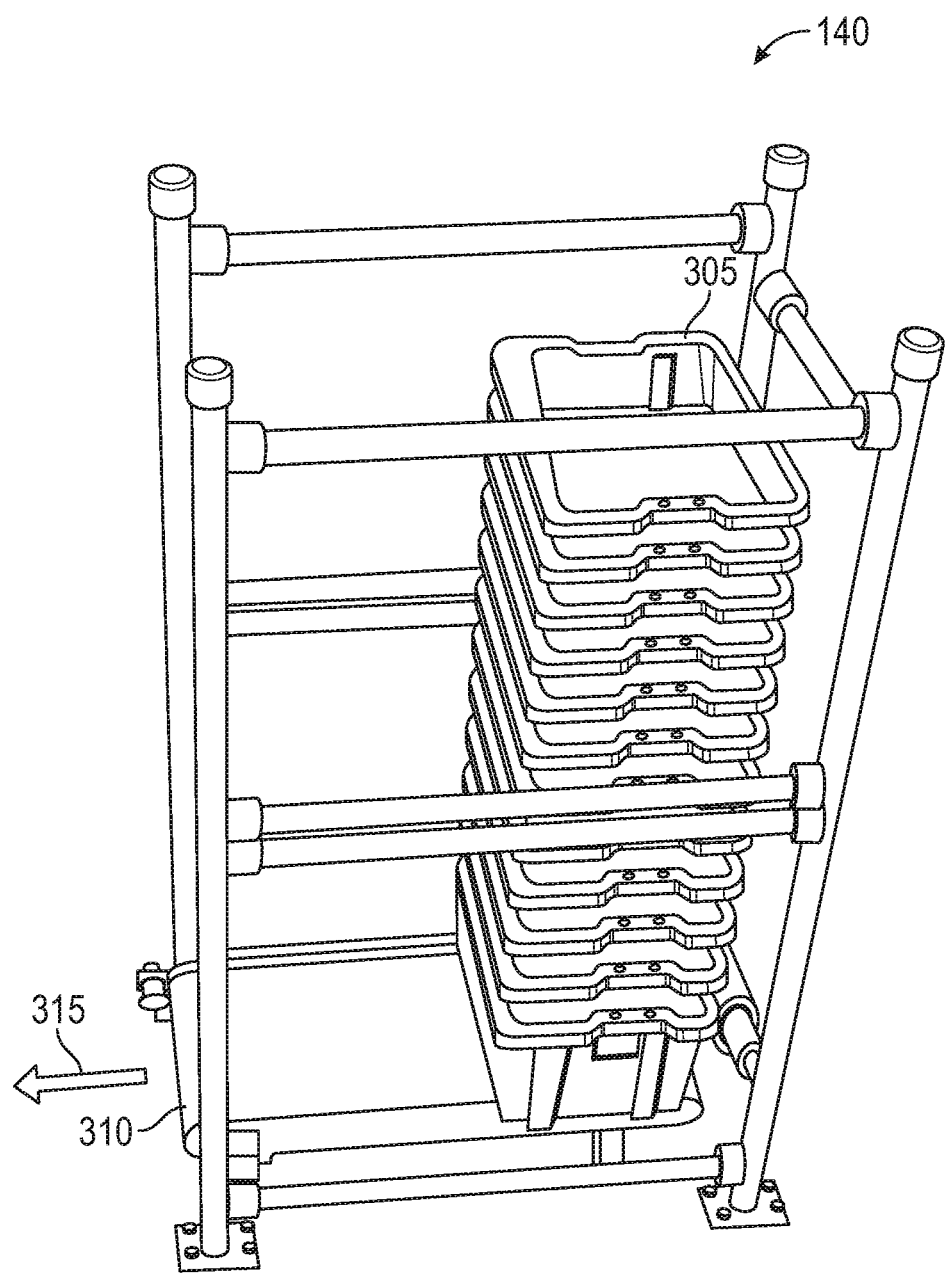
FIG. 3 is a tote buffer station in a decant station, according to various embodiments.

FIG. 3 is a tote buffer station 140 in a decant station, according to various embodiments. The tote buffer station 140 includes a conveyor belt 310 which can rotate to move a tote stack 305 in the direction illustrated by the arrow 315. As mentioned above, the conveyor belt 310 is alignable with a conveyor belt in the tote dispenser (not shown) which is disposed to the left of the tote buffer station 140. Thus, by activating the conveyor belt 310, the tote stack 305 can be transferred from the conveyor belt 310 onto the conveyor belt in the tote dispenser.

The conveyor belt 310 may also be activated when an associate or machine loads another tote stack into the station 140. For example, an associate or machine may position a new tote stack 305 onto the right side of the conveyor belt 310 which the conveyor belt 310 then moves into the tote buffer station 140. In this manner, the tote buffer station 140 can stow one or more tote stacks 305 which then can moved into the tote dispenser positioned to the left of the tote buffer station 140.

While the tote buffer station 140 includes a conveyor belt 310 for transferring the stacks of totes, in another embodiment the tote buffer station 140 could include rollers where the right side of the tote buffer station 140 is raised relative to the left side (e.g., the rollers are titled) so that a stack of totes rolls out of the tote buffer station 140 and onto a conveyor belt in the tote dispenser.

Returning to the method 200, at block 207 the lift raises the stack of totes to align the stack with a first pair of support members and a second pair of support members. For example, when loading the stack of totes onto the conveyor belt in the tote dispenser, the conveyor belt may be near the ground. Once loaded, the lift can raise the conveyor belt, and thus, raise the stack of totes up (e.g., a distance of several feet) to align the stack of totes with the first pair of support members and the second pair of support members. In one embodiment, the lift aligns the first pair of support members with the second from the bottom tote in the stack while aligning the second pair of support members with the bottom tote in the stack.

At block 210 the tote dispenser engages the first pair of support members with the second from the bottom tote (referred to here as the "second tote") in the stack. The first pair of support members may be disposed on opposite sides of the second tote and engage with one or more surfaces of the second tote so as to provide support for the remaining totes in the stack. For example, by engaging the first pair of support members with a downward facing surface or surfaces on the second tote, the first pair of support members can hold the remaining totes in the stack. Stated differently, the first pair of support members supports the remaining totes in the stack so that the bottom tote in the stack can be removed from the stack. Illustrative embodiments of removing a bottom tote from a stack of totes will now be described with reference to FIGS. 4A-4H.

Figure 4A:
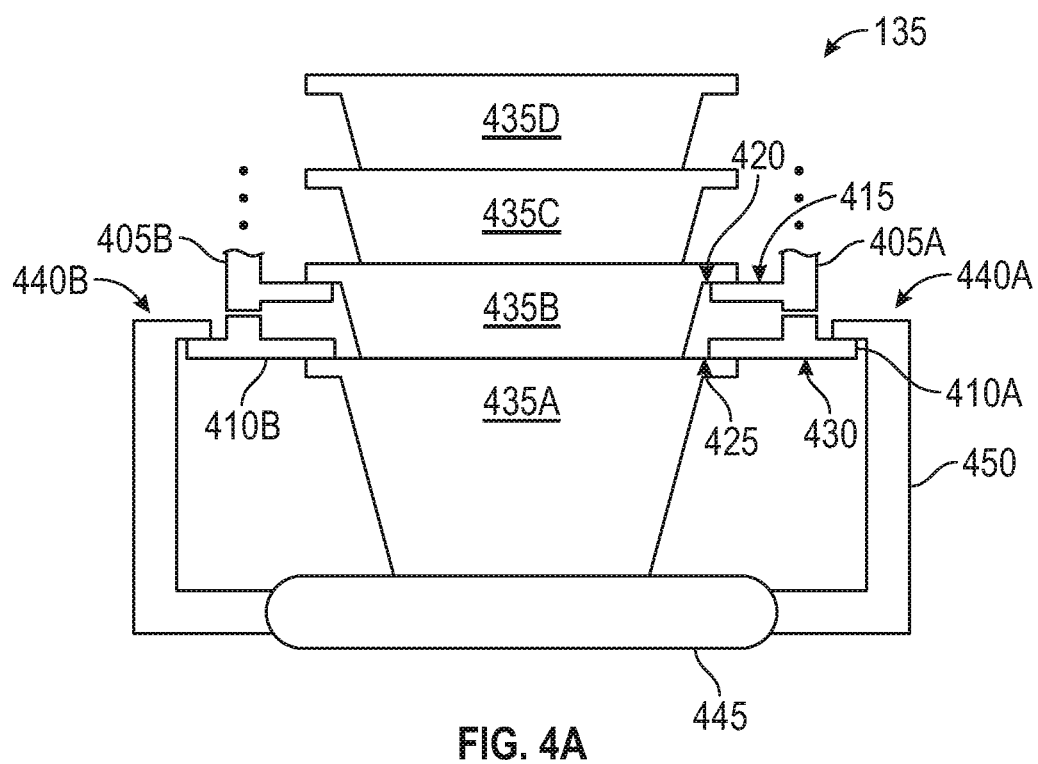
FIGS. 4A-4H illustrate removing a bottom tote from a stack of totes, according to various embodiments.

FIG. 4A illustrates engaging support members 405A and 405B (collectively forming a first pair of support members) to a second from the bottom tote 435B in a stack of totes in the tote dispenser 135. That is, respective upper surfaces 415 of the support members 405A and 405B contact a downward facing surface 420 on the tote 435B. This contact between the upper surfaces 415 and the surface 420 of the tote 435B provides support for the remaining totes in the stack—e.g., totes 435C and 435D. In one embodiment, the upper surfaces 415 contact a downward facing surface 420 at the lip of the tote 435B but this is not a requirement. In other examples, the first pair of support members 405A and 405B can contact any downward facing surface on the tote 435B that is sufficient for balancing and supporting the remaining totes in the stack.

Returning to the method 200, at block 215 the tote dispenser engages the second pair of support members with the bottom tote in the stack. This is also illustrated in FIG. 4A which includes support members 410A and 410B (collectively referred to as the second pair of support members) which each have a respective bottom surface 430. The bottom surfaces 430 contact an upward facing surface 425 on a bottom tote 435A in the stack. As described below, the contact between the bottom surfaces 430 of the support members 410A and 410B with the upward facing surface 425 permits the support members 410A and 410B to provide a downward force to move the bottom tote 435A downward and away from the remaining totes 435 as the conveyor belt 445 is lowered.

In FIG. 4A, the bottom surfaces 430 contact the upward facing surface 425 at the lip of the tote 435A but this is not a requirement. In other example, the second pair of support members 410A and 410B can contact any upward facing surface on the tote 435A which is sufficient for pulling or pushing the tote 435A from the remaining totes in the stack. Moreover, the shape and movement of the support members 405 and 410 are described in more detail below.

Figure 4B:
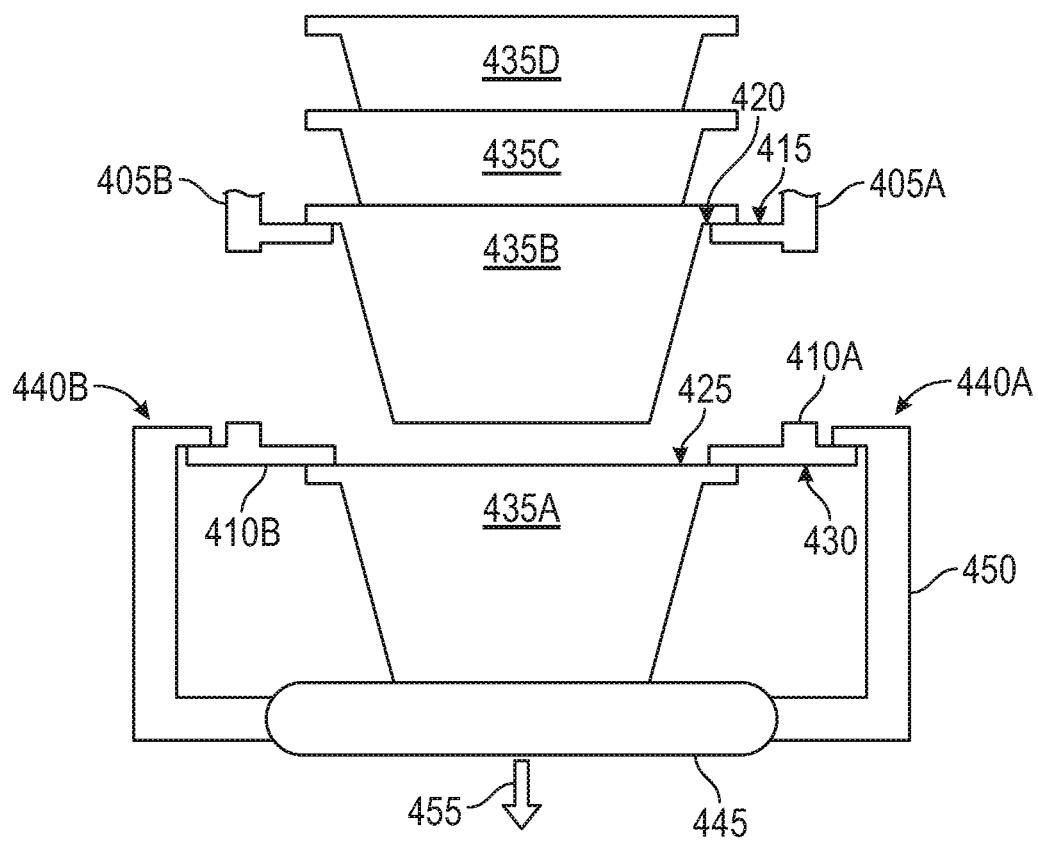

At block 220, a lift in the tote dispenser lowers the conveyor belt and the second pair of support members to separate the bottom tote from the stack while the first pair of support members supports the remaining totes in the stack. In one embodiment, the first and second pairs of support members apply forces on the bottom tote and the second from the bottom tote which increases the vertical separation distance between the first and second pairs of support members, thereby separating the bottom tote from the stack. This is illustrated in FIG. 4B where the arrow 455 indicates lowering the conveyor belt 445 away from the totes 435. In this embodiment, the conveyor belt 445 is rigidly attached to a lift connector 450 which couples the conveyor belt 445 to the lift (not shown) that raises or lowers the conveyor belt 445 as described herein. Moreover, the lift connectors 450 are coupled to catches 440A and 440B which selectively couple the lift connectors 450 (and in turn the conveyor belt 445) to the second pair of support members 410A and 410B. When lowering the conveyor belt 445, the catch 440A contacts a portion of the support member 410A while the catch 440B contacts a portion of the support member 410B. Thus, when lowering the conveyor belt 445, the lift connector 450 also lowers the first pair of support members 410A and 410B using the catches 440.

In one embodiment, the first pair of support members 410A and 410B are attached to a biasing element which applies a force that pulls the support members 410A and 410B upward. However, the force applied by the biasing element (e.g., a spring) is overcome by the force applied the catches 440 so that the second pair of support members 410A and 410B are moved downward in tandem with the conveyor belt 445. Further, when lowering the conveyor belt 445 and the second pair of support members 410A and 410B, the tote dispenser 135 holds the first pair of support members 405A and 405B in place. Thus, while the second pair of support members 410A and 410B pull the bottom tote 435A down, the first pair of support members 405A and 405B support the remaining totes 435B-435D in a fixed position.

In one embodiment, the tote dispenser 135 never moves the first pair of support members 405A and 405B in a vertical direction (although the support members 405A and 405B may move in a horizontal direction in order to engage and disengaged from the totes 435 as described below). However, in other embodiments, the first pair of support members 405A and 405B may move vertically when engaging/disengaging the support members 405A and 405B from the totes 435 or when support members 405A and 405B are being aligned with the totes 435.

Returning to the method 200, at block 225 the conveyor belt in the tote dispenser ejects the bottom tote using the conveyor belt. For example, after the second pair of support members have pulled down the bottommost tote to clear the second from the bottom tote, the tote dispenser activates the conveyor belt to then move the bottom tote from the tote dispenser and onto the roller table.

Figure 4C:
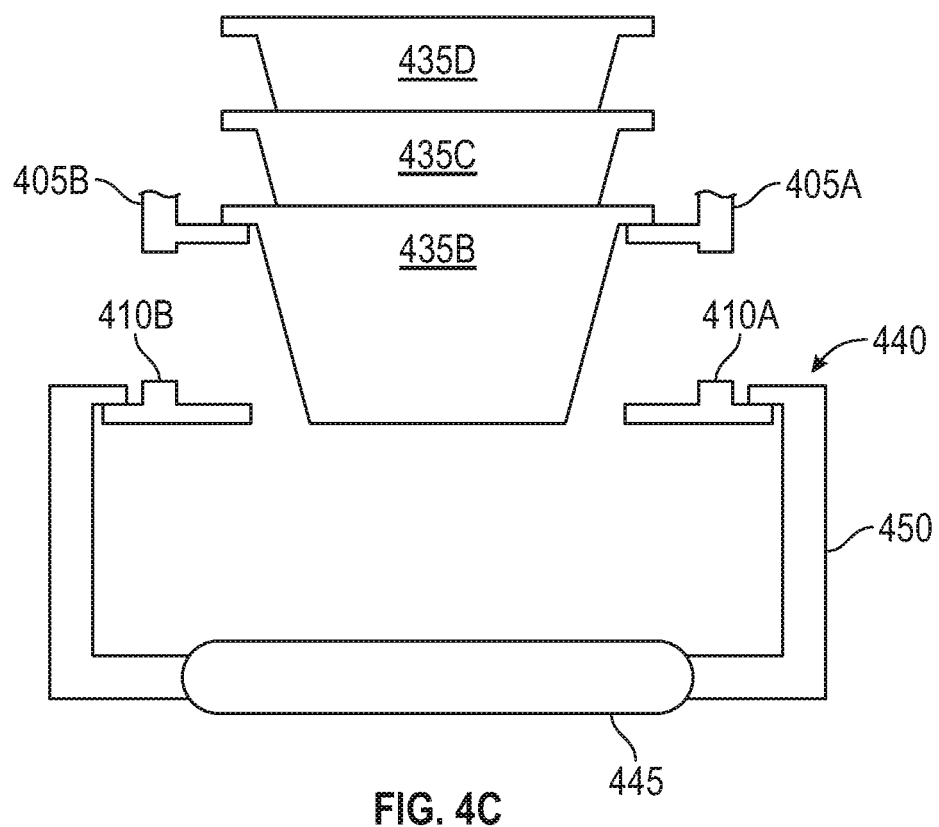

FIG. 4C illustrates the state of the tote dispenser 135 after the conveyor belt 445 has ejected the bottom tote. As such, only the totes 435B-435D remain in the stack. The first pair of support members 405A and 405B continues to support the remaining totes. In one embodiment, the support members 405A and 405B do not move when ejecting the bottom tote. In this manner, the tote dispenser 135 can remove and eject the bottommost tote from a stack of totes while supporting the remaining totes in the stack.

FIG. 2B continues the method 200 from FIG. 2A. While FIG. 2A describes ejecting the bottom tote, FIG. 2B describes the portion of method 200 used to realign the first and second pairs of support members so that the next tote in the stack (e.g., the new bottommost tote) can be removed.

Figure 4D:
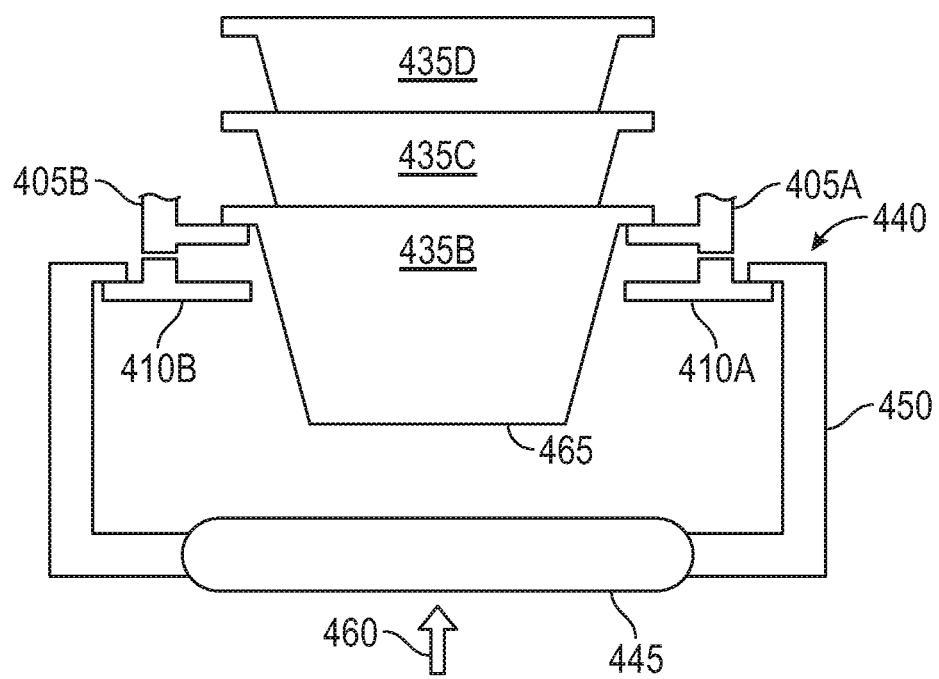

At block 230, the lift in the tote dispenser raises the conveyor belt and the second pair of support members. FIG. 4D illustrates raising the conveyor belt 445, the lift connectors 450, the catches 440, and the second pair of support members 410A and 410B in a direction towards the remaining totes 435B-435D as illustrated by the arrow 460. In one embodiment, the lift provides the force used to lift the conveyor belt 445, the lift connector 450, and the catches 440 in the direction shown by the arrow 460. In contrast, the second pair of support members 410A and 410B may be lifted by the biasing element described above (and not shown) such as a spring. That is, pulling the support members 410A and 410B downward using the catches 440 as shown in FIGS. 4B and 4C can apply a tension on the biasing element that pulls the second pair of support members 410A and 410B upwards (although this upward force is overcome by the lift). Thus, when the lift moves the catches 440 upwards in FIG. 4D, the tension in the biasing element also applies a force which pulls the second pair of support members 410A and 410B upwards in parallel with the movement of the catches 440.

At the time shown in FIG. 4D, the second pair of support members 410A and 410B have raised to a location where they contact the first pair of support members 405A and 405B. This contact prevents the second pair of support members 410A and 410B from raising further in the upwards direction illustrated by the arrow 460. However, at this location, the conveyor belt 445 has not yet reached a bottom surface 465 of the bottom tote 435B. That is, the conveyor belt 445 does not yet support the totes 435.

Figure 4E:
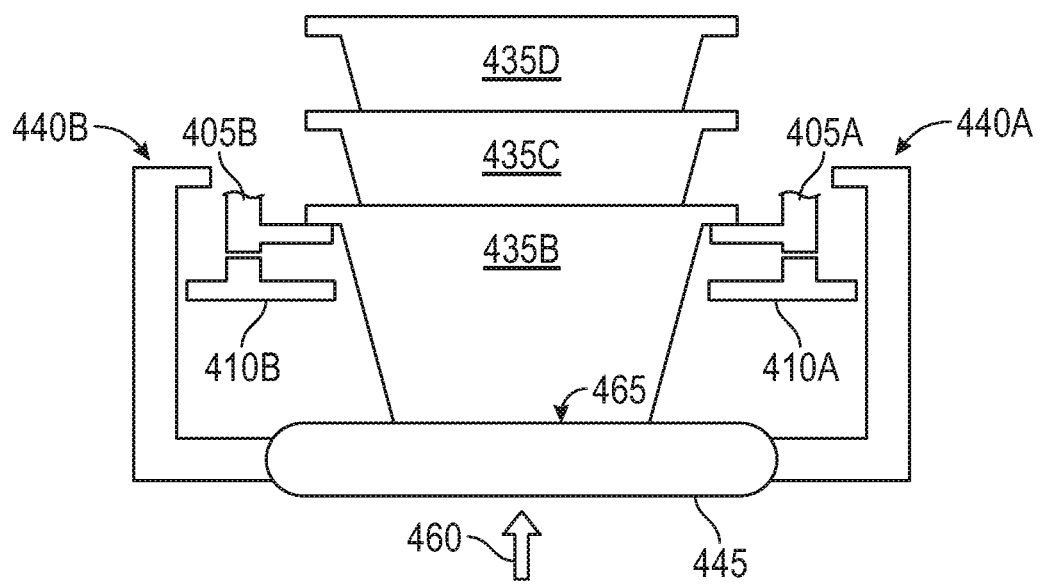

FIG. 4E illustrates continuing to move the conveyor belt 445, the lift connectors 450, and the catches 440 until the conveyor belt 445 contacts the bottom surface 465 of the bottom tote 435B. However, because the second pair of support members 410A and 410B contacts the first pair of support members 405A and 405B, the second pair of support members 410A and 410B have not moved further in the vertical direction relative to the position of these elements in FIG. 4D. As such, there is now a space between the catches 440 and the second pair of support members 410A and 410B. This space may range between a first centimeters to several inches. Also, the biasing element connected to the second pair of support members 410A and 410B can provide a force that maintains the support members 410A and 410B in contact with the first pair of support members 405A and 405B.

Moreover, although FIG. 4E illustrates that the first pair of support members 405A and 405B continue to contact the lip of the bottom tote 435B, the lift can raise the conveyor belt 445 to force the bottom tote 435B away from the first pair of support members 405A and 405B such that these members no longer support the stack of totes 435. Instead, the conveyor belt 445 fully supports the totes.

Figure 4F:
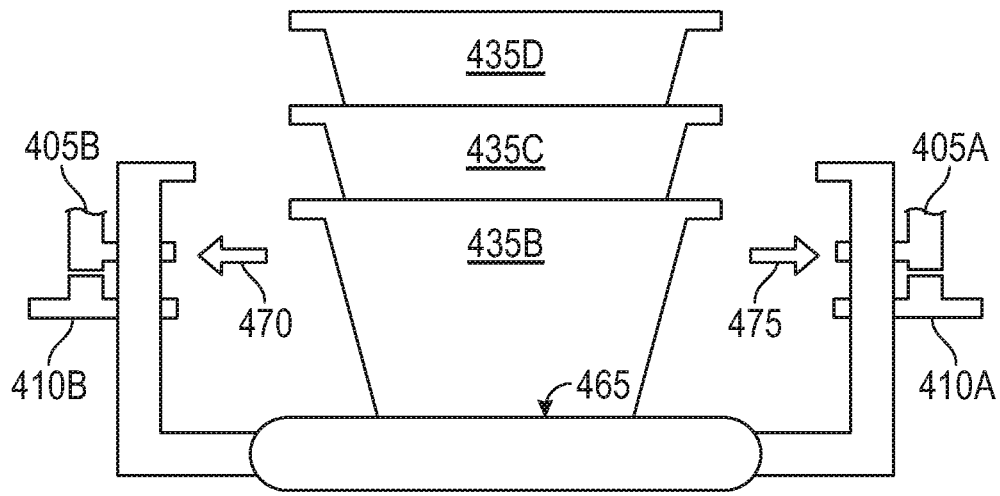

At block 235, the tote dispenser disengages the first and second pairs of support members from the stack of totes. This is shown in FIG. 4F where the support members 405A and 410A are moved in the horizontal (or lateral) direction illustrated by arrow 475 and the support members 405B and 410B are moved in the horizontal direction illustrated by arrow 470. This horizontal movement of the support members 405 and 410 away from the totes 435 can be achieved by rotating the support members along a curved path or by a linear movement in the direction of the arrows 470 and 475. In any case, disengaging the support members 405 and 410 results in the lift being able to move the totes vertically using the conveyor belt 445 so that the totes do not strike the support members 405 and 410.

At block 240, the tote dispenser aligns the first and second pairs of support members with the bottom tote and the second from the bottom tote. Instead of the tote dispenser moving the first and second pairs of support members in order to align them with the bottom tote and the second from the bottom tote, in the embodiment shown in FIG. 4G, the tote dispenser 135 moves the conveyor belt 445 in order to control the vertical alignment of the tote stack with the first and second pairs of support members 405 and 410. In this example, the tote dispenser aligns the stack of totes such that the first pair of support members 405A and 405B are positioned below the lip of the second from the bottom tote 435C and the second pair of support members 410A and 410B are positioned above the lip of the bottom tote 435B. In general, the tote dispenser aligns the first and second pairs of support members 405 and 410 so that when these members are reengaged with the totes, the members are in a facing relationship with the surfaces on the totes which are used to remove the bottom tote 435B while simultaneously supporting the remaining totes 435C and 435D in the stack.

Figure 4G:
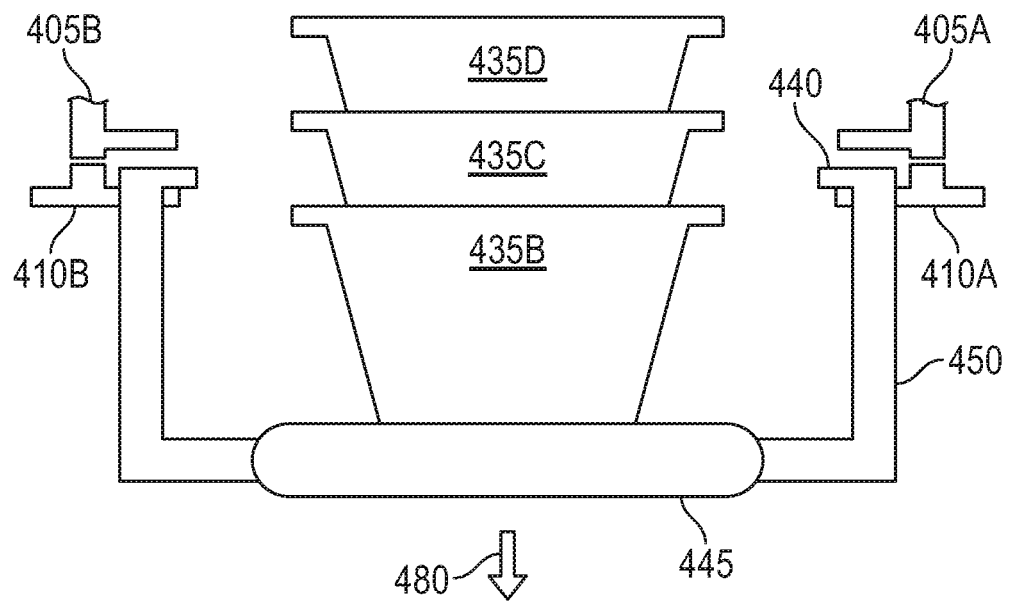
Figure 4H:
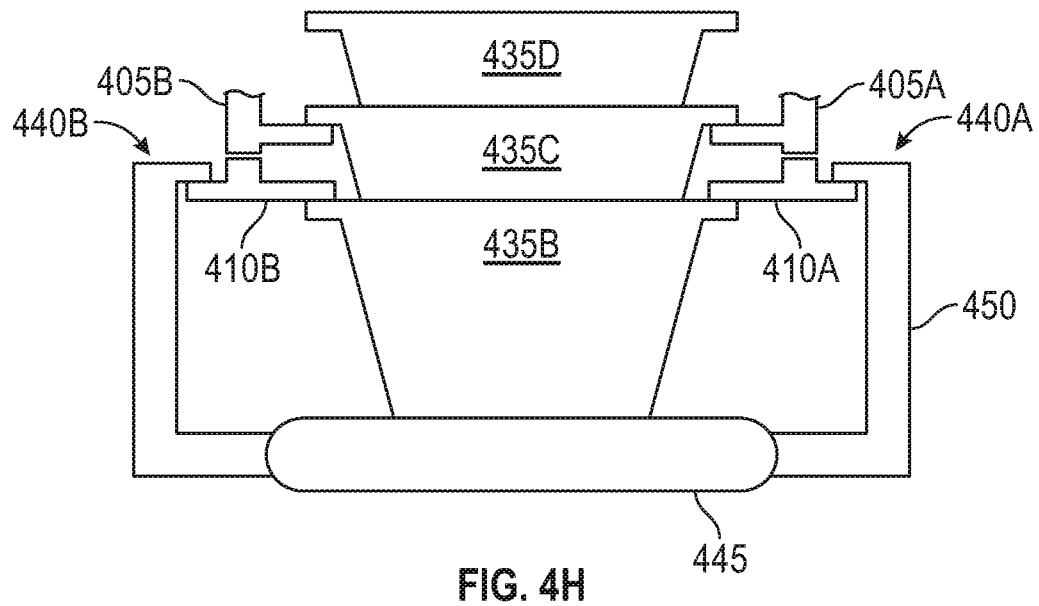

At block 245, the tote dispenser engages the first pair of support members with the second from the bottom tote. This is illustrated in FIG. 4H where the first pair of support members 405A and 405B is moved in directions towards the tote 435C. When reengaged, the first pair of support members 405A and 405B are in a facing relationship with a downwards facing surface of the tote 435C (e.g., the surface 420 illustrated in FIG. 4A) which can be used to support the stack when the bottom tote 435B is removed.

In one embodiment, when reengaging the first pair of support members 405A and 405B, the support members 405A and 405B may not contact the tote 435C. Thus, reengaging the first pair of support members 405A and 405B does not necessarily mean the support members 405A and 405B are already supporting or contacting the second from the bottom tote 435C. For example, the support members 405A and 405B may be spaced apart from the lip of the tote 435C in FIG. 4H. In that example, when the lift lowers the conveyor belt 445, the lip of the tote 435C is brought into contact with the first pair of support members 405A and 405B, thereby supporting the remaining totes in the stack while the bottom tote 435B is removed.

At block 250, the tote dispenser engages the second pair of support members with the bottom tote. This is also illustrated in FIG. 4H where the second pair of support members 410A and 410B is moved in directions towards the bottom tote 435B. When reengaged, the second pair of support members 410A and 410B are in a facing relationship with an upwards surface of the tote 435B (e.g., the surface 425 illustrated in FIG. 4A) which can be used to remove the bottom tote 435B from the remaining totes in the stack.

Like when reengaging the first pair of support members 405A and 405B, the second pair of support members 410A and 410B may not contact the tote 435B. Thus, reengaging the second pair of support members does not necessarily mean the support members 410A and 410B are already contacting the bottom tote 435B. For example, the support members 410A and 410B may be spaced apart from the lip of the tote 435B in FIG. 4H. In that example, when the lift lowers the catches 440 so they reengage and pull down the support members 410A and 410B, the lip of the tote 435B is brought into contact with the second pair of support members 410A and 410B, thereby pulling the bottom tote 435B from the other totes 435.

In one embodiment, the alignment of the support members 405 and 410 with the totes 435B and 435C illustrated in FIG. 4H is approximately the same as the alignment of the support members 405 and 410 with the totes 435A and 435B in FIG. 4A.

At block 255, the lift lowers the conveyor belt and the second pair of support members to separate the bottom tote from the stack, while the first pair of support members supports the remaining totes in the stack. This is illustrated in FIG. 4B where the second pair of support members 410A and 410B have pulled the bottom tote (which would be tote 435B, rather than tote 435A) from the remaining totes in the stack that are supported by the first pair of support members 405A and 405B.

At block 260, the tote dispenser ejects the bottom tote into the decant area. That is, once the bottom tote is free or clear of the remaining totes in the stack, the conveyor belt in the tote dispenser can activate and move the tote onto the roller table.

Figure 5:
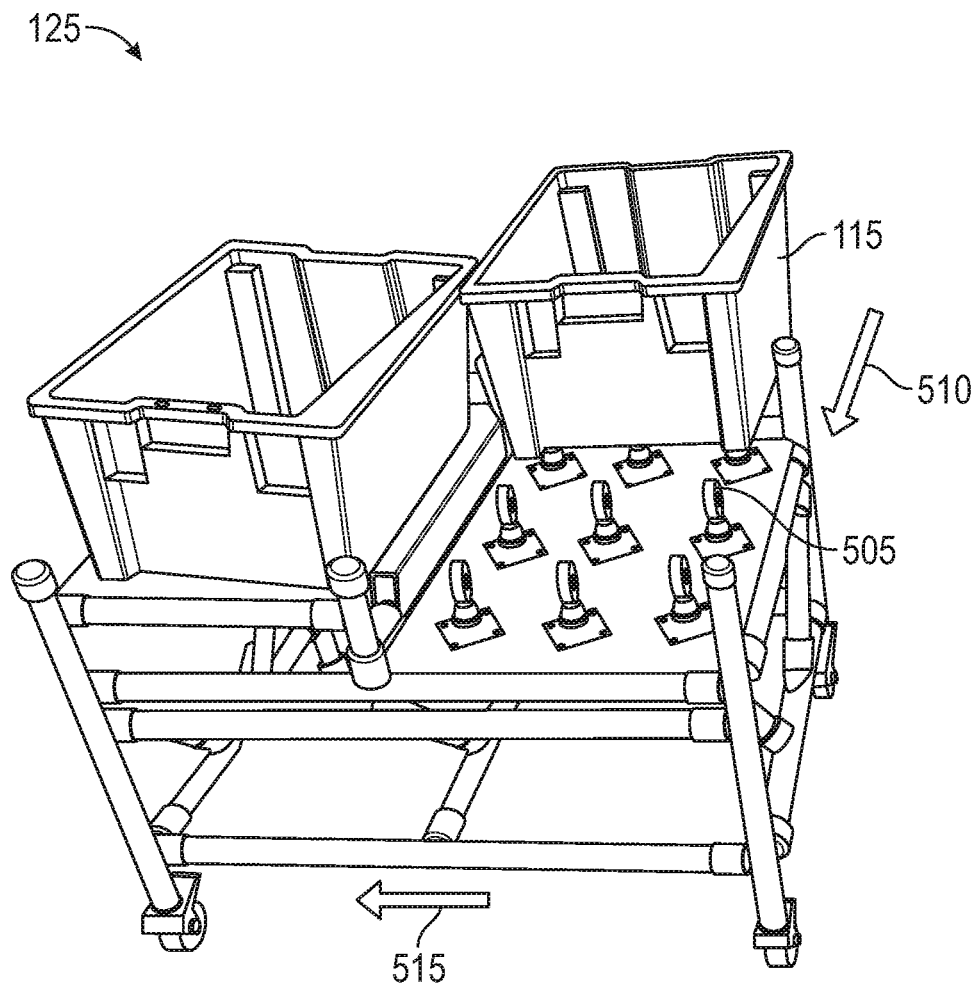
FIG. 5 is a roller table in a decant station, according to various embodiments.

FIG. 5 is a roller table 125 in a decant station, according to various embodiments. The arrow 510 illustrates a direction from which the totes 115 are ejected from the tote dispenser (not shown) onto the roller table 125. In this example, the tote dispenser ejects the totes 115 onto a portion of the roller table 125 that includes an array of caster wheels 505. In one embodiment, the ejected tote 115 sits on the caster wheels 505 until a new tote is needed by the associate. The associate can then grab the tote 115 and move it in a direction illustrated by the arrow 515 to a loading position on the roller table 125. There, the associate can begin to load items which have been removed from their packaging into the empty tote 115. The caster wheels 505 can rotate and swivel so that the associate can easily move the totes 115 into the loading position of the roller table 125. Although caster wheels 505 are shown, the roller table 125 can include any means that permit the associate to slide or roll the totes 115 into the loading position.

Returning to the method 200, at block 265, the tote dispenser determines whether there are any remaining totes in the tote dispenser. If the tote dispenser has not ejected all the totes in the stack received from the tote buffer station, the method 200 proceeds to block 230 where the method 200 repeats. That is, the tote dispenser realigns the first and second pairs of support members to again remove the bottommost tote in the stack. However, if there are no remaining totes in the tote dispenser, the method 200 proceeds to block 270 where the tote buffer station transfers another stack onto the conveyor belt in the tote dispenser. The method can then return to block 210 where the method 200 repeats.

While the discussion above described using two pairs of support members, the method 200 can be performed using a first support member and a second support member. For example, the first support member (which is tasked with supporting the remaining totes) may include a forked extension where a first side of the forked extension contacts a first side of the tote and a second side contacts the opposite side of the same tote. The second support member (which applies a force to push the bottom tote from the stack) could be a single paddle that pushes down on one side of the bottom tote rather than applying forces on opposite sides of the bottom tote as shown in FIGS. 4A-4H. Thus, rather than having a pair of support members, the tote dispenser could have a unitary support member (e.g., a forked extension) for supporting the second from the bottom tote and another unitary support member (e.g., a paddle) for applying a force that removes the bottom tote.

Figure 6:
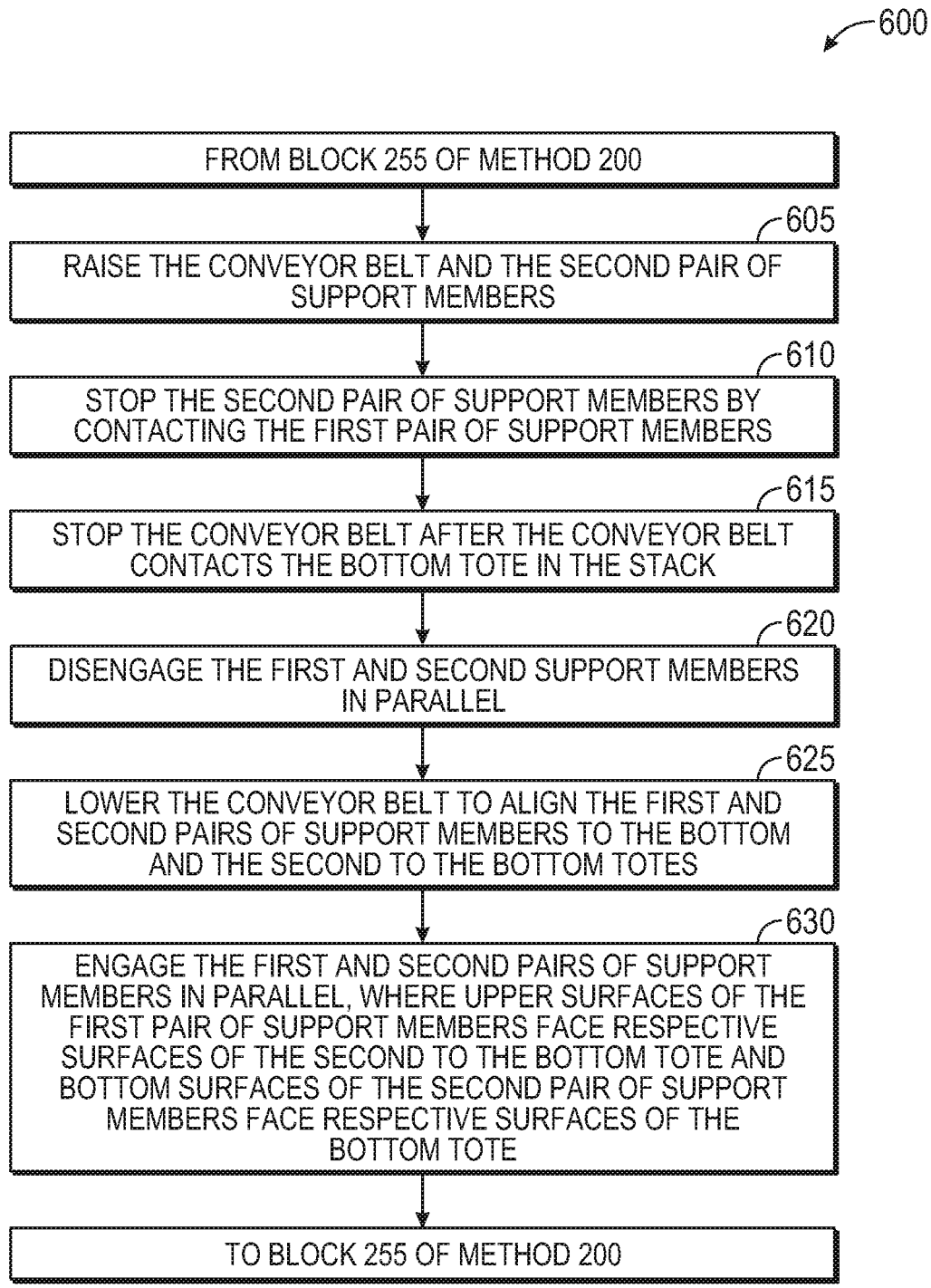
FIG. 6 is a flowchart for aligning pairs of support members to remove the bottom tote from a stack of totes, according to various embodiments.

FIG. 6 is a flowchart of a method 600 for aligning pairs of support members to remove the bottom tote from a stack of totes, according to various embodiments. The method 600 provides additional embodiments and technique for performing some of the block in method 200. The method 600 begins after block 225 of method 200 has been performed.

At block 605, the tote dispenser raises the conveyor belt and the second pair of support members. This is illustrated in FIG. 4D where the lift raises the conveyor belt 445, the lift connector 450, and the catches 440. The second pair of support members 410A and 410B can be lifted by the biasing element mentioned above.

At block 610, the tote dispenser stops the second pair of support members by contacting the first pair of support members. This is also illustrated in FIG. 4D where the biasing elements raise the second support members 410A and 410B until they contact the first pair of support members 405A and 405B. In this example, the conveyor belt has not yet contacted the bottom surface 465 of the bottom tote 435B.

In one embodiment, contacting the first and second pairs of support members 405 and 410 establishes an alignment distance or spacing between the support members 405 and 410. This spacing may be used by the tote dispenser to ensure that the first and second pairs of support members 405 and 410 are in a facing relationship with the desired surfaces of the bottom tote and the second from the bottom tote when these members are reengaged with the stack of totes.

At block 615, the tote dispenser stops the conveyor belt after the conveyor belt contacts the bottom tote in the stack. That is, as illustrated in FIG. 4E, the lift continues to raise the conveyor belt 445, the lift connectors 450, and the catches 440 after the second pair of support members 410A and 410B contact the first pair of support members 405A and 405B. Continuing to raise these elements disengages the catches 440 from the second pair of support members 410A and 410B. In one embodiment, disengaging the catches 440 permits the second pair of support members 410A and 410B to be moved in a lateral direction away from the totes 435.

At block 620, the tote dispenser disengages the first and second support members in parallel. For clarity, the method 600 is described in parallel with FIGS. 7A-7C which illustrate various states of a tote dispenser in a decant station, according to various embodiments.

Figure 7A:
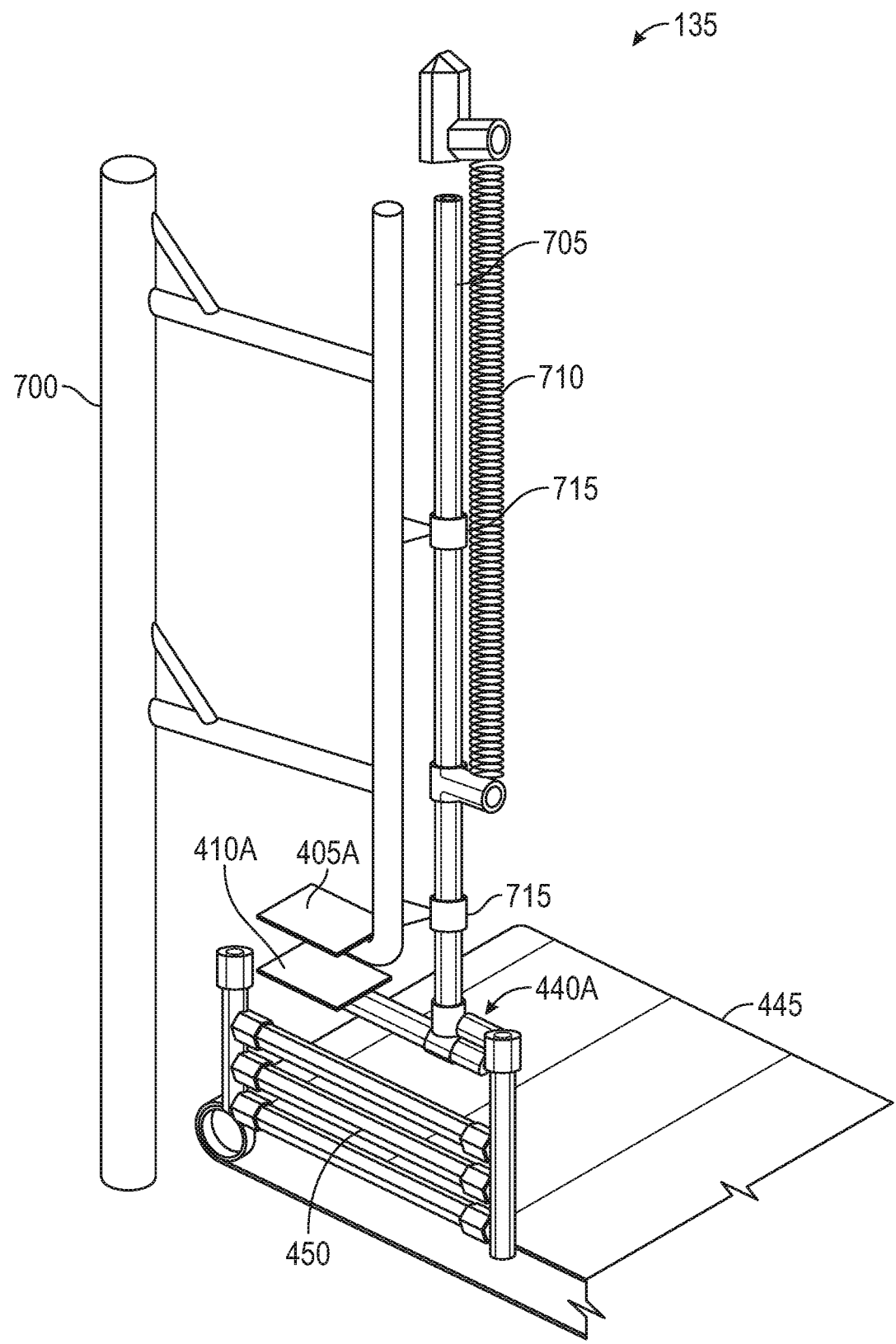
FIGS. 7A-7C illustrate various states of a tote dispenser in a decant station, according to various embodiments.

FIG. 7A illustrates a plan view of a portion of the tote dispenser 135 which includes a swivel 700 that is fixably attached to the support member 405A (which is part of the first pair of support members). Moreover, collars 715 connect the swivel 700 to a telescoping rod 705 which is fixably attached to the support member 410A (which is part of the second pair of support members). In one embodiment, the collars 715 include ball bearings or wheels which permit the telescoping rod 705 to move vertically relative to the swivel 700. That is, when the catch 440A is engaged with the support member 410A, the lift (not shown) can pull down the support member 410A which also pulls down the telescoping rod 705. Doing so creates a tension in a spring 710 (e.g., a biasing element) which is connected to at an upper end to a portion of the tote dispenser 135 (e.g., an extension that forms part of the swivel 700 which does not move in a vertical direction) and at a lower end of the telescoping rod 705 which can move vertically. As described above, the tension of the spring 710 can hold the support member 410A in contact with the catch 440A when engaged and hold the support member 410A in alignment with the support member 405A when the catch 440A is not engaged.

In addition to moving the support member 410A using the catch 440A, the lift can also move the lift connector 450 and the conveyor belt 445 in a vertical direction. Although not shown in FIGS. 7A-7C, the tote dispenser 135 can also include a corresponding swivel and telescoping rod for supporting the other support members (e.g., support members 405B and 410B) on an opposite side of the tote dispenser.

Moreover, the shape of the support members 405 and 410 is not limited to the shapes illustrated in FIGS. 4A-4H and FIGS. 7A-7C. For example, the support members 405A and 410A in FIG. 7A are planar surfaces (e.g., paddles) which contact planar surfaces in the totes. In other embodiments, the support members 405 and 410 may be V-shaped which can mate with corresponding V-shaped surfaces on the totes. In yet another example, the support members 405 and 410 may be clips or grabbers that can be selectively connected to sides of the totes. The embodiments herein can be used with any type or shape of support members which permit the tote dispenser to remove an individual tote from a stack of totes.

Figure 7B:
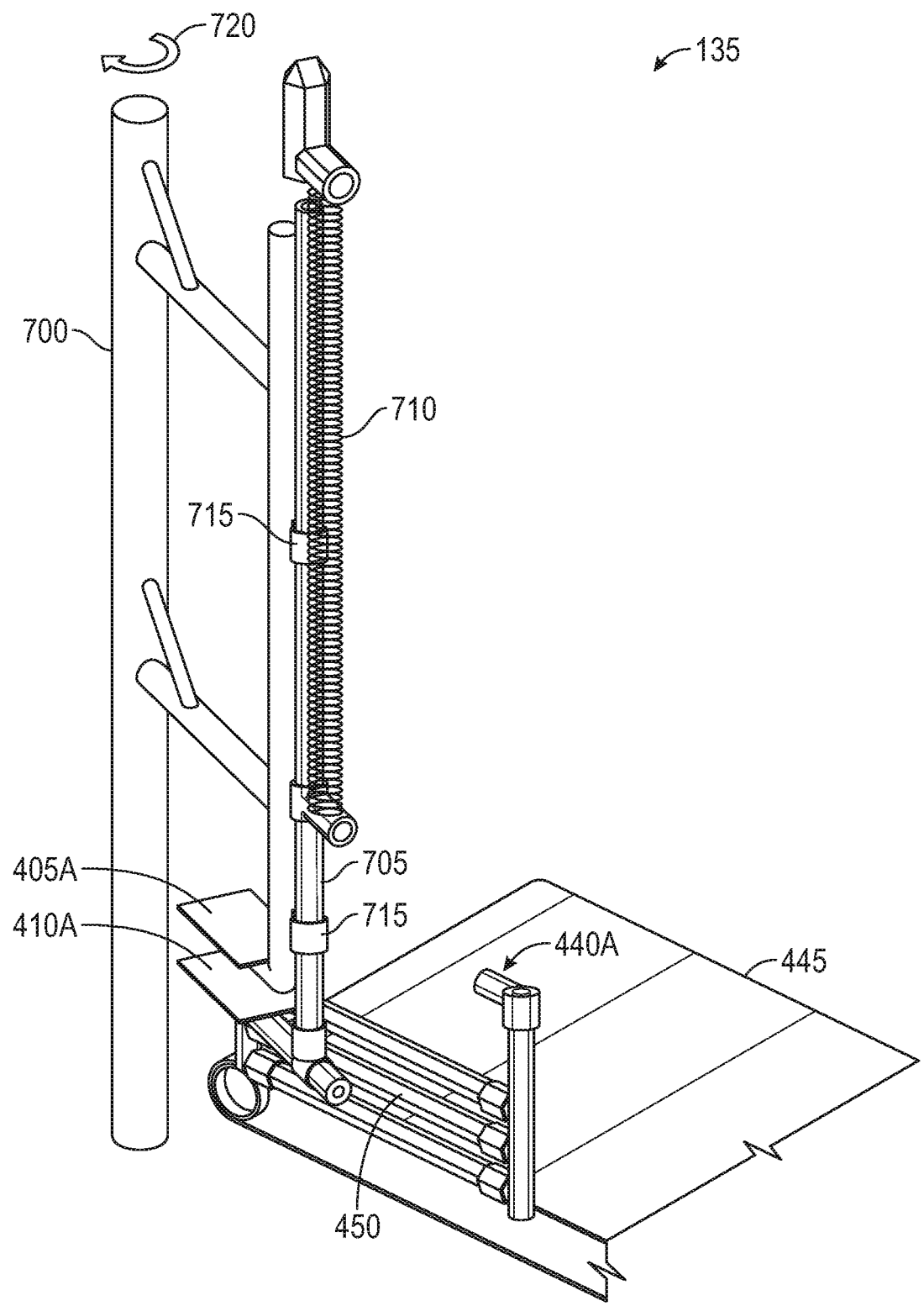

FIG. 7B illustrates positions of the support members 405A and 410A when disengaged from the totes in the tote stack. As shown, the swivel 700 rotates as shown by the rotation 720. This causes a corresponding rotation of the support member 405A which is fixably attached to the swivel 700. Moreover, because the telescoping rod 705 is connected via the collars 715 to the swivel 700, rotating the swivel also rotates the rod 705 and the support member 710A. As noted above, the support member 710A may have previously been disengaged from the catch 440A, thereby preventing the swivel 700 from rotating the support member 710A away from the stack of totes.

Using the structure illustrated in FIG. 7B, the rotation 720 of the swivel 700 can disengage the support members 405A and 410A in parallel. The tote dispenser can be controlled such that a corresponding swivel on the other side of the tote dispenser disengages the support members 405B and 410B in parallel, which can be at the same time the support members 405A and 410A are disengaged.

At block 625, the tote dispenser lowers the conveyor belt to align the first and second pairs of support members to the bottom and the second to the bottom totes. This is illustrated in FIG. 4G and can occur when the support members 405A and 410A are in the positions illustrated in FIG. 7B.

At block 630, the tote dispenser engages the first and second pairs of support members in parallel such that upper surfaces of the first pair of support members face respective surfaces of the second to the bottom tote and bottom surfaces of the second pair of support members face respective surfaces of the bottom tote. One example of this is illustrated in FIG. 4A where the support members 405A and 405B face the surface 420 of the tote 435B and the support members 410A and 410B face the surface 425 of the tote 435A.

Moreover, when engaging the first and second pairs of support members, the support members may not contact the totes. Instead, engaging the support members can include arranging the support members in a facing relationship with respective surfaces in the totes. Later, when the lift activates, the first and second pairs of support members can contact the respective surfaces to apply forces for separating the totes.

Figure 7C:
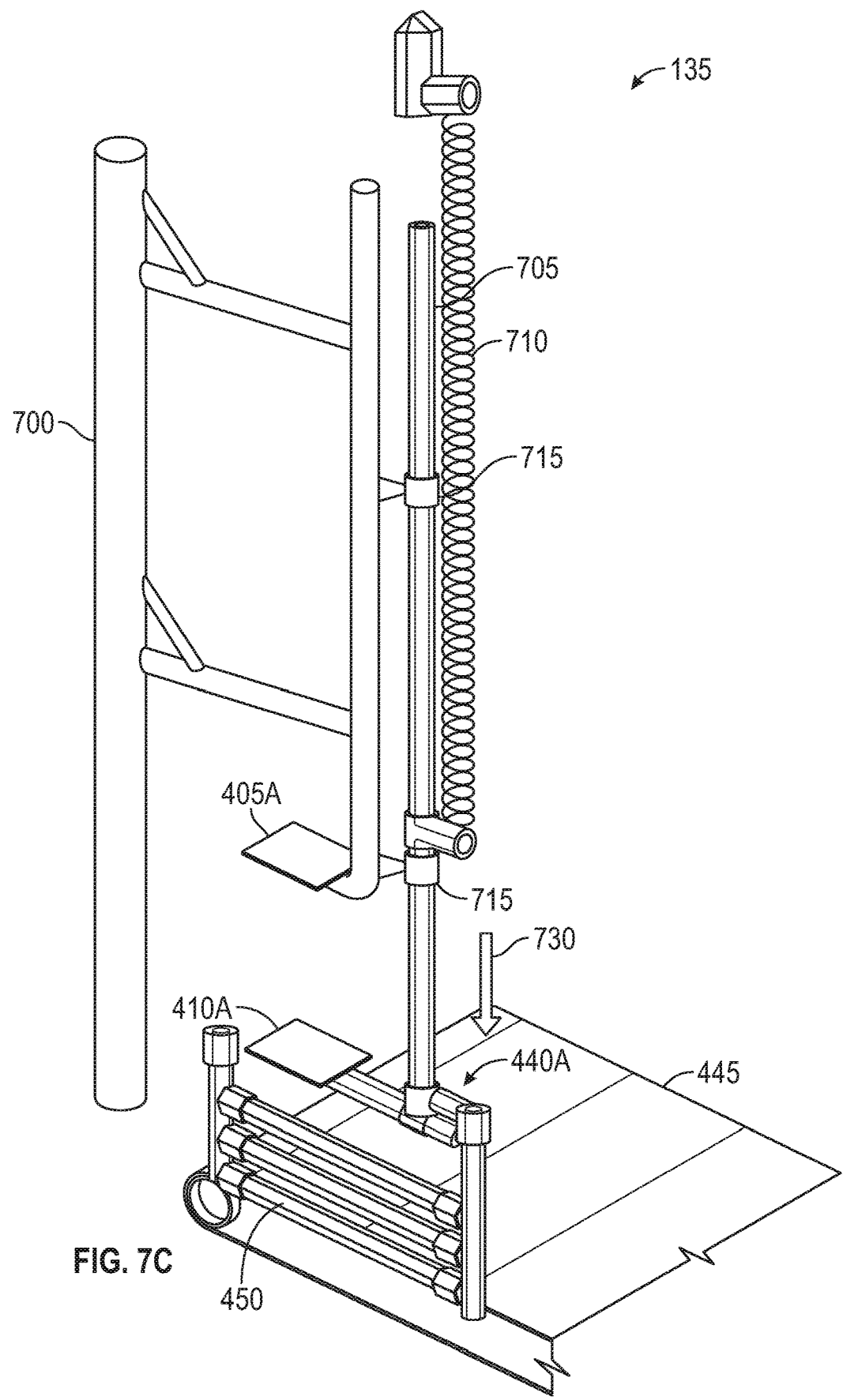

The method 600 then proceeds to block 255 of the method 200 where the lift activates and separates the bottom tote from the stack as described above. FIG. 7C illustrates using the lift to lower the support member 410A away from the support member 405A (e.g., increase the vertical separation distance), thereby separating the bottom tote from the remaining totes in the stack. As shown, the catch 440A is engaged with the support member 410A. For example, the catch 440A may have an upside down V-shape which locks with the cylindrical shaped portion of the support member 410A below the catch 440A.

In response to the lift lowering the conveyor belt 445, the lift connector 450, and the catch 440A, the catch 440A applies a force along the direction illustrated by arrow 730 to move the support member 410A downward. In addition to separating the support member 410A from the support member 405A (which separates the bottom tote from the stack), the force applied in the direction of arrow 730 also increases the tension on the spring 710. The tension ensures that the spring 710 constantly provides an upward biasing force which can be used to pull the support member 410A upwards when the lift raises the lift connector 450. In this manner, the position of the support member 410A is controlled in the vertical direction.

Figure 8:
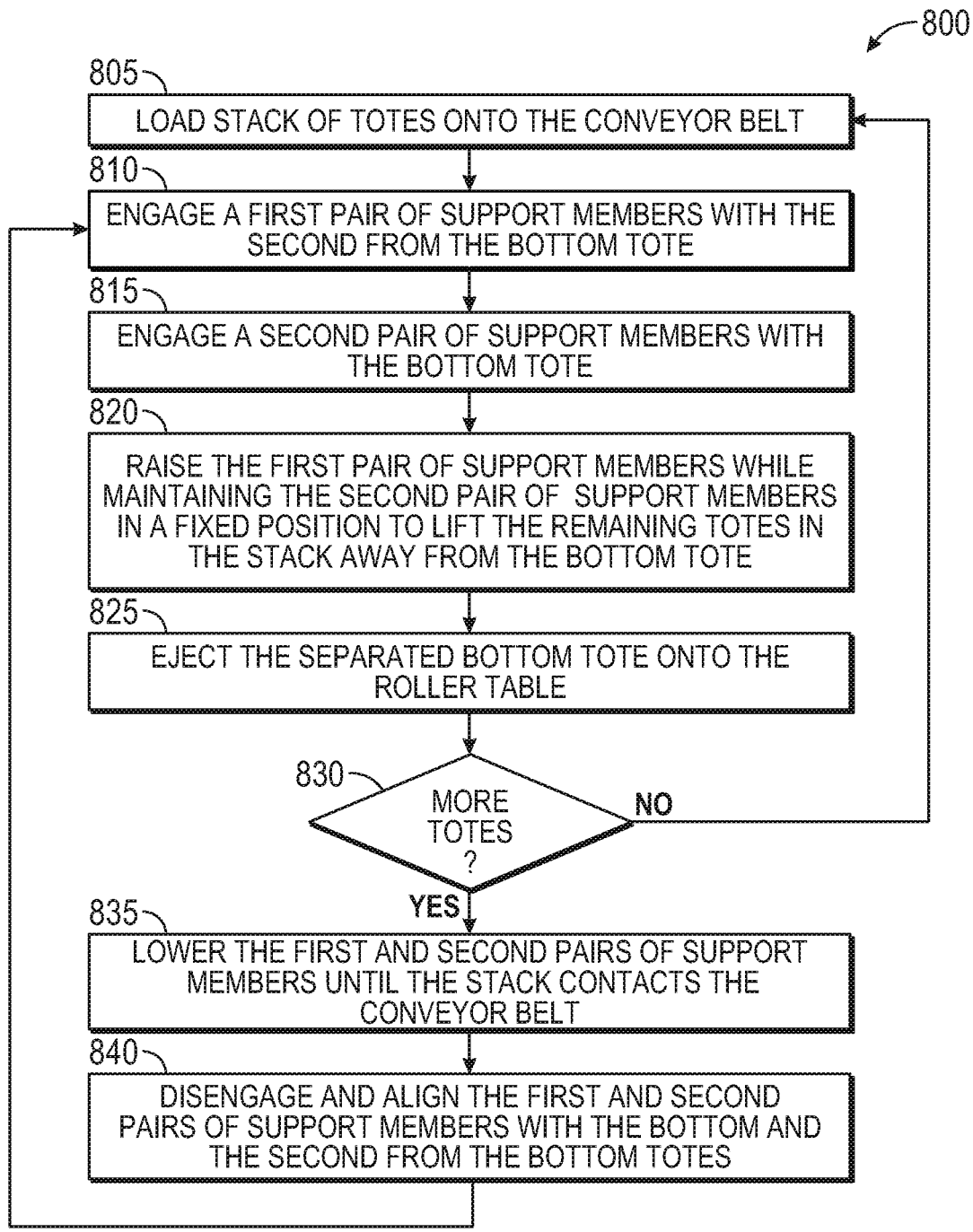
FIG. 8 is a flowchart for removing a bottom tote from a stack of totes, according to various embodiments.

FIG. 8 is a flowchart of a method 800 for removing a bottom tote from a stack of totes, according to various embodiments. The method 800 differs from the methods 200 and 600 in that the method 800 moves the first pair of support members in an upward direction to pull the remaining totes in the stack away from the bottom tote in the stack which may remain stationary. Stated differently, rather than move the second pair of support members along with the conveyor belt downward to remove the bottom tote, in the method 800 the remaining totes are moved up so that the bottom tote is the only tote supported by the conveyor belt. Using method 800 rather than method 200 may have disadvantages and advantages such as using additional cylinders or greater pneumatic pressures when moving the support members but the conveyor belt can remain stationary.

At block 805, the tote buffer station 140 loads a stack of totes onto the conveyor belt in the tote dispenser.

At block 810, the tote dispenser engages a first pair of support members with the second from the bottom tote. At block 815, the tote dispenser engages a second pair of support members with the bottom tote. The shape and engagement of the first and second pairs of support members can be according to any of the embodiments described above. For example, the first and second pairs of support members 405 and 410 can be engaged with the totes 435 as shown in FIG. 4A.

At block 820, the lift in the tote dispenser raises the first pair of support members while maintaining the second pair of support members in a fixed position to lift the remaining totes in the stack away from the bottom tote. In one embodiment, the bottom tote remains in contact with the conveyor belt (which is also stationary) while the first pair of support members moves the remaining totes in the stack upward. That is, the second pair of support members can apply a downward force on the bottom tote which keeps the bottom tote in contact with the conveyor belt while the first pair of support members lift the remaining totes.

At block 825, the conveyor belt ejects the separated bottom tote onto the roller table.

At block 830, the tote dispenser determines whether there are more totes in the stack. If not, the method 800 returns to block 805 to load another stack of totes from the tote buffer station into the tote dispenser. Otherwise, the method 800 proceeds to block 835 where the tote dispenser lowers the first and second pairs of support members until the stack contacts the conveyor belt. Moving the first pair of support members controls the vertical position of the stack. Thus, the lift can move the first pair of support members down until the bottom surface of the new bottom tote contacts the conveyor belt (which may remain stationary throughout method 800).

Because the second pair of support members may be in a position that blocks the first pair of support members from lowering the stack until the stack contacts the conveyor belt, at block 835, the second pair of support members is also lowered to provide room for the first pair of support members to lower so that the stack again contacts the conveyor belt. In one embodiment, the vertical position of the second pair of support members may be separately controllable from the vertical position of the first pair of support members. Alternatively, the second pair of support members may be moved by the first pair of support members. For example, as the lift moves the first pair of support members downward, the first pair of support members eventually contact the second pair of support members to push the second pair of support members downward until the bottom tote contacts the conveyor belt.

At block 840, the tote dispenser disengages and aligns the first and second pairs of support members with the bottom and the second from the bottom totes. In one embodiment, after block 835, the conveyor belt rather than the first pair of support members supports the stack of totes. As such, the first pair of support members can disengage from the stack of totes which are now supported by the conveyor belt. In the method 800, the second pair of support members is also disengaged. Disengaging the first and second pairs of support members permit the lift to move the support members vertically until they align with the bottom tote and the second from the bottom tote.

In one embodiment, the tote dispenser moves the first and second pairs upwards in a direction away from the conveyor belt until the first and second pairs of support members are aligned with the bottom tote and the second from the bottom tote. One example of this alignment is illustrated in FIG. 4G. The method 800 then returns to block 810 where the first and second pairs of support members reengage with the stack of totes in order to again remove the bottom tote in the stack.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGS. illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A tote dispenser comprising:
   a conveyor belt;
   a first pair of support members configured to selectively engage with a first tote that is second from the bottom in a stack of totes;
   a second pair of support members configured to selectively engage with a second tote that is at the bottom of the stack;
   a lift configured to, when the first and second pairs of support members are respectively engaged with the first tote and the second tote:
   lower the conveyor belt and the second pair of support members to separate the second tote from the stack while the first pair of support members supports the remaining totes in the stack;

wherein the conveyor belt is configured to eject the second tote from the tote dispenser once separated from the remaining totes in the stack;
telescoping rods attached to the second pair of support members;
collars through which the telescoping rods extend, wherein the collars connect the telescoping rods to the first pair of support members; and
swivels connected to the collars and the first pair of support members, wherein the swivels are configured to rotate to disengage the first and second pairs of support members from the stack of totes in parallel.

2. The tote dispenser of claim 1, wherein, when lowering the conveyor belt and the second pair of support members to separate the second tote from the stack while the first pair of support members support the remaining totes in the stack, respective upward facing surfaces of the first pair of support members contact one or more downward facing surfaces on the first tote and respective downward facing surfaces of the second pair of support members contact one or more upward facing surfaces on the second tote.

3. The tote dispenser of claim 1, further comprising:
catches attached to the conveyor belt, wherein the catches are configured to contact the second pair of support members in order to lower the second pair of support members when separating the second and first totes from the remaining totes in the stack.

4. The tote dispenser of claim 3, further comprising:
a spring configured to bias at least one of the second pair of support members in a first direction opposite of a second direction in which the catches lower the second pair of support members.

5. The tote dispenser of claim 4, wherein raising the conveyor belt and the second pair of support members disconnects the catches from the second pair of support members.

6. A tote dispenser comprising:
a conveyor belt;
a first support member configured to selectively engage with a first tote that is second from the bottom in a stack of totes;
a second support member configured to selectively engage with a second tote that is at the bottom of the stack;
a lift configured to, when the first and second support members are respectively engaged with the first tote and the second tote:
separate the second tote from the stack by applying a first force to the first tote using the first support member and a second force to the second tote using the second support member,
wherein the conveyor belt is configured to eject the second tote from the tote dispenser once separated from the remaining totes in the stack; and
a catch attached to the conveyor belt, wherein the catch is configured to selectively connect with the second support member in order to lower the second support member when separating the second tote from the stack.

7. The tote dispenser of claim 6, wherein the first force is an upward force that supports the remaining totes in the stack and the second force is a downward force that moves the second tote away from the first tote.

8. The tote dispenser of claim 6, wherein the lift is further configured to, when separating the second tote from the stack:
lower the conveyor belt and the second support member to separate the second tote from the stack while the first support member supports the remaining totes in the stack.

9. The tote dispenser of claim 8, wherein the lift is configured to:
raise the conveyor belt and the second support member until the conveyor belt contacts a bottom surface of the first tote;
align the first support member with a third tote, wherein the third tote is second from the bottom in the stack;
align the second support member with the first tote, wherein the tote dispenser is configured to engage the first support member with the third tote and the second support member with the first tote; and
lower the conveyor belt and the second support member to separate the first tote from the stack while the second support member supports the remaining totes in the stack.

10. The tote dispenser of claim 6, wherein the lift is further configured to, when separating the second tote from the stack:
raise the first support member to separate the second tote from the stack while the second support member and the conveyor belt remain stationary.

11. The tote dispenser of claim 6, wherein, when separating the second tote from the stack, an upward facing surface of the first support member contacts a downward facing surface on the first tote and a downward facing surface of the second support member contacts an upward facing surface on the second tote.

12. The tote dispenser of claim 6, further comprising:
a biasing element configured to bias the second support member in a first direction opposite of a second direction in which the catch lowers the second support member.

13. A method, comprising:
engaging a first support member with a first tote that is second from the bottom in a stack of totes;
engaging a second support member with a second tote that is at the bottom of the stack;
increasing a separation distance between the first and second support members, thereby separating the second tote from the stack;
applying, when increasing the separation distance between the first and second support members, a biasing force to the second support member, wherein the biasing force is in a direction opposite to a direction the second tote moves; and
ejecting the second tote from a tote dispenser.

14. The method of claim 13, wherein, when increasing the separation distance between the first and second support members, an upward facing surface of the first support member contacts a downward facing surface on the first tote and a downward facing surface of the second support member contacts an upward facing surface on the second tote.

15. The method of claim 13, wherein increasing the separation distance between the first and second support members further comprises:
applying an upward force using the first support member that supports the remaining totes in the stack and a downward force using the second support member that moves the second tote away from the first tote.

16. The method of claim 13, wherein increasing the separation distance between the first and second support members further comprises:

lowering a conveyor belt and the second support member to separate the second tote from the stack while the first support member remains stationary and supports the remaining totes in the stack.

17. The method of claim 16, further comprising:
raising the conveyor belt and the second support member until the conveyor belt contacts a bottom surface of the first tote;
aligning the first support member with a third tote, wherein the third tote is second from the bottom in the stack;
aligning the second support member with the first tote,
engaging the first support member with the third tote and the second support member with the first tote; and
lowering the conveyor belt and the second support member to separate the first tote from the stack while the second support member supports the remaining totes in the stack.

\* \* \* \* \*